(12) United States Patent
Wable et al.

(10) Patent No.: US 9,203,926 B2
(45) Date of Patent: Dec. 1, 2015

(54) SYSTEM AND METHOD OF CREATING UNIQUE PROFILES ON A SOCIAL NETWORKING SITE

(71) Applicant: Dropbox, Inc., San Francisco, CA (US)

(72) Inventors: Akhil Wable, San Francisco, CA (US); Aditya Agarwal, San Francisco, CA (US); Ruchi Sanghvi, San Francisco, CA (US); Joshua Jenkins, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 271 days.

(21) Appl. No.: 13/854,437

(22) Filed: Apr. 1, 2013

(65) Prior Publication Data

US 2014/0082073 A1    Mar. 20, 2014

Related U.S. Application Data

(60) Provisional application No. 61/702,043, filed on Sep. 17, 2012.

(51) Int. Cl.
*H04L 29/08* (2006.01)
*G06Q 50/00* (2012.01)

(52) U.S. Cl.
CPC .............. *H04L 67/306* (2013.01); *G06Q 50/01* (2013.01)

(58) Field of Classification Search
CPC ...... H04L 67/306; H04L 51/32; H04L 65/403
USPC ......................................................... 709/204
See application file for complete search history.

(56) References Cited

U.S. PATENT DOCUMENTS

2009/0171691 A1*   7/2009  Lubarski et al. ................... 705/1
2011/0191417 A1*   8/2011  Rathod .......................... 709/204

* cited by examiner

*Primary Examiner* — Ruolei Zong
(74) *Attorney, Agent, or Firm* — Novak Druce Connolly Bove + Quigg LLP

(57) ABSTRACT

A social networking system enables users to join multiple user groups and create separate profiles for each group they join on the site. Each profile has a default set of user fields and a set of customized, administrator-created fields. Members of a group may create a profile when joining a particular group and may create the profile using a custom profile template generated for each group. Thus, if the same user joins a second group, they can create a new profile for the second group based on a profile template that is unique to the second group. The system may use information from the first profile to auto-populate the second profile if the second profile includes one or more of the same fields as the first profile. However, users may be able to edit the auto-populated information in the second profile to make it more specific to the second group.

20 Claims, 16 Drawing Sheets

SYSTEM AND METHOD OF CREATING UNIQUE PROFILES ON A SOCIAL NETWORKING SITE

CLAIM OF PRIORITY

This application claims priority under 35 U.S.C. §119(e) to the filing date of U.S. Provisional Patent Application No. 61/702,043, filed Sep. 17, 2012, entitled, "A System And Method Of Creating Unique Profiles On A Social Networking Site," which is incorporated herein by reference in its entirety.

BACKGROUND

Social networking sites allow users to collaborate and share information. Within the context of such sites, users often establish a user profile that includes basic information, such as the user's name, occupation, workplace, and educational background. Currently, most social networking sites use a single user profile for each user. However, this can be problematic if the user interacts with different circles of other users on the site. In some cases, for example, certain portions of a user's profile may not be relevant to certain circles of users (e.g., individuals that the user works with), but may be highly relevant to other circles of users (e.g., individuals that the user socializes with). There is currently a need for improved systems and methods that address this issue.

SUMMARY

A computer-implemented method, according to various embodiments, provides a user of a social networking site with the ability to create a unique profile for each group that the user joins within the context of the social networking site. In various embodiments, the method comprises the steps of: (1) receiving, from a first user, a request to form a first group; (2) in response to the request, forming a first group on the social networking site that allows users of the social networking site to join the first group; (3) facilitating the creation of a first member profile template that is unique to the first group; (4) receiving, from a second user, a request to form a second group; (5) in response to the request, forming a second group that allows users of the social media site to join the second group; (6) facilitating the creation of a second member profile template that is unique to the second group; (7) in response to a third user joining the first group, facilitating the creation of a first profile based on the first member profile template; and (8) in response to the third user joining the second group, facilitating the creation of a second profile based on the second member profile template, wherein the first profile differs from the second profile.

In some embodiments, the first member profile template comprises a first group of fields that are specific to the first group, and the second member profile template comprises a second group of fields that are specific to the second group. In these embodiments, the first group of fields further comprises: (1) one or more default fields that are common to both the first member profile template and the second member profile template, and (2) a plurality of custom fields that are specific to the first group. In various embodiments, the default field is a name field. In other embodiments, the default field may also include an e-mail field. In still further embodiments, the custom fields for the first member profile template are user-defined and created when a user of the social networking site forms the first group. In yet other embodiments, the at least one default field is automatically populated based on information a user enters when joining the social networking site.

A computer system according to various embodiments comprises at least one processor, and memory that is operatively coupled to the at least one processor. The at least one processor is configured to: (1) receive, from a user of the social networking site, a first set of profile information based on a first group profile template that the user completes when joining the first group on the social networking site; (2) generate, for the user, a first group profile based on the first set of profile information, wherein the first group profile for the user is unique to the first group; (3) receive, from the user, a second set of profile information based on a second group profile template that the user completes when the user joins a second group on the social networking site, and (4) generate, for the user, a second group profile based on the second set of profile information, wherein the second group profile for the user is unique to the second group, and wherein the member profile for the user for the first group can only be viewed by members of the first group.

In various embodiments, the first set of profile information and the second set of profile information contain common data. In still other embodiments, the at least one processor is further configured to allow the user to maintain a plurality of group profiles, each group profile being based on a respective group profile template required to be completed for each group. In these embodiments, each of the plurality of group profiles contains information that is unique to its respective group.

In still other embodiments, the first group profile contains a plurality of common information and a plurality of custom information that is unique to the first group. In yet other embodiments, the at least one processor is further configured to allow an administrator of the group to create a member profile template when the administrator creates the group on the social networking site. In some embodiments, all members of the first group are required to complete the same first group profile template.

A computer-implemented method according to a particular embodiment comprises: (1) receiving, from a user, a first set of information that the user enters into a first profile template for use in establishing a first profile for the user within a context of a first user group on a social networking site; (2) receiving, from the user, a second set of information that the user enters into a second profile template for use in establishing a second profile for the user within the context of a second user group on the social networking site; (3) facilitating the creation of, within the context of the first user group on the social networking site, a first profile for the user based on the first set of information; (4) facilitating the creation of, within the context of the second user group on the social networking site, a second profile for the user based on the second set of information; and at a particular time: (1) using the first profile for the user within the context of the first user group; and (2) using the second profile for the user within the context of the second user group.

In some embodiments, the first profile contains different information from the second profile. In yet other embodiments, the step of receiving the first set of information comprises receiving the completed first member profile template from the user when the user joins the first group, and the step of receiving the second set of information comprises receiving the completed second member profile template from user when the user joins the second group.

In other embodiments, the first user group further comprises a first set of users of the social networking site, the second user group further comprises a second set of users of the social networking site, and at least one user of the first set of users is not a member of the second set of users. In some embodiments, the user can change the information associated with the set of default fields. In other embodiments, all members of the first group are required to complete the same first group profile template.

BRIEF DESCRIPTION OF THE DRAWINGS

Various embodiments of a computer system for a social networking site that allows users to maintain unique profiles for each group they join is described below. In the course of this description, reference will be made to the accompanying drawings, which are not necessarily drawn to scale, and wherein:

FIG. 5 is a screen display according to a particular embodiment that shows a home page for a group on the social networking system of FIG. 1;

FIGS. 8A-8E are screen displays according to a particular embodiment that shows an initial search of the members of the group whose home page is shown in of FIG. 5;

DETAILED DESCRIPTION OF VARIOUS EMBODIMENTS

Figure 1:
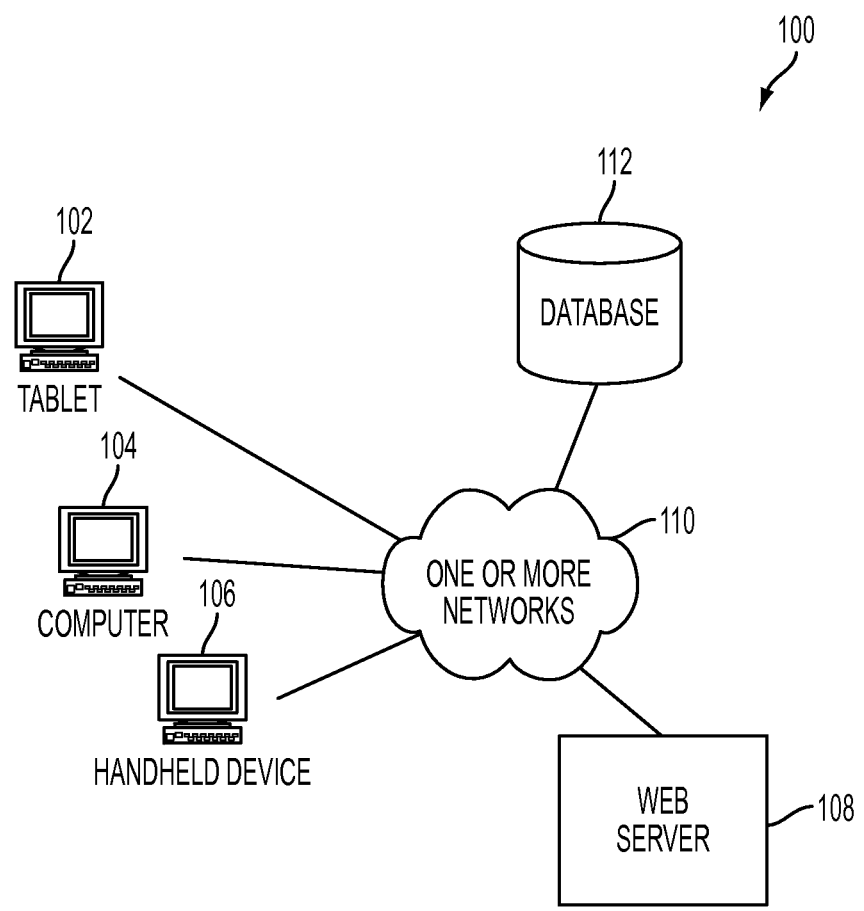
FIG. 1 is a block diagram of a social networking system according to a particular embodiment.

Various embodiments now will be described more fully hereinafter with reference to the accompanying drawings. It should be understood that the invention may be embodied in many different forms and should not be construed as limited to the embodiments set forth herein. Like numbers refer to like elements throughout.

System Overview

A computer system, according to various embodiments, is adapted for providing a social networking site that allows users to join and interact with different groups of other users. Particular user groups may, for example, be formed based upon the personal or professional interests of the users, the users' educational backgrounds, or any other suitable criteria. Examples of social networking sites on which various methods described herein may be used include Facebook, Twitter, MySpace, LinkedIn, and any other social networking site that allows users to join multiple groups.

A system according to various embodiments enables users to join multiple groups on a social networking site, and to create a unique profile for each group that they join on the site. In a particular embodiment, each profile has a default set of user fields, and a set of customized, administrator-created fields. Members of a group may be required to create a profile when joining the group using a profile template that has been specifically generated for the group. Thus, if the same user joins a second group, they must create a new (e.g., different) profile for the second group based on a profile template that is unique to the second group. In some embodiments, the system may use information from the first profile to pre-populate the second profile if the second profile is to include information that is similar information from the first profile. However, users may be allowed to change the pre-populated information in the second profile to make it more specific to the second group.

In various embodiments, the default user fields for a particular group profile include the following information: (1) name; (2) gender; (3) e-mail address; and (4) city of residence. The custom fields may be administrator defined and may be, for example, in the form of free text or a list of items. The custom fields may be fully customizable and may, in various embodiments, not be limited in any way, except as to whether information for each field is received in free text or list format.

In various embodiments, the system also provides a member search capability using free text searching that allows users to search for other members based on information included within the users' respective user profiles. By searching on specific fields from within the users' profiles, a user may filter the member group down to a subgroup of members that meet certain criteria important to the searcher. The system may further be configured to allow the user to send specific messages, or invitations to the filtered subgroup of members, or to initiate chat communications with the subgroup of members. Thus, the system provides an efficient means for choosing a subgroup of members and for communicating directly with those members.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Exemplary System Architecture

FIG. 1 is a block diagram of a social networking system 100 according to a particular embodiment. As may be understood from this figure, social networking system 100 includes one or more remote computing devices such as a tablet computer 102, a desktop or laptop computer 104, or a handheld computing device 106 (such as a cellular phone) that are in communication with a web server 108 (which, for example, may be used to execute one or more modules as described below) and a database 112 (which, for example, may be used to store the web content discussed below) via one or more computer networks 110. The one or more computer networks 110 may include any of a variety of types of wired or wireless computer networks such as the Internet. The communication link between web server 108 and database 112 may be, for example, implemented via a Local Area Network (LAN) or via the Internet.

Figure 2:
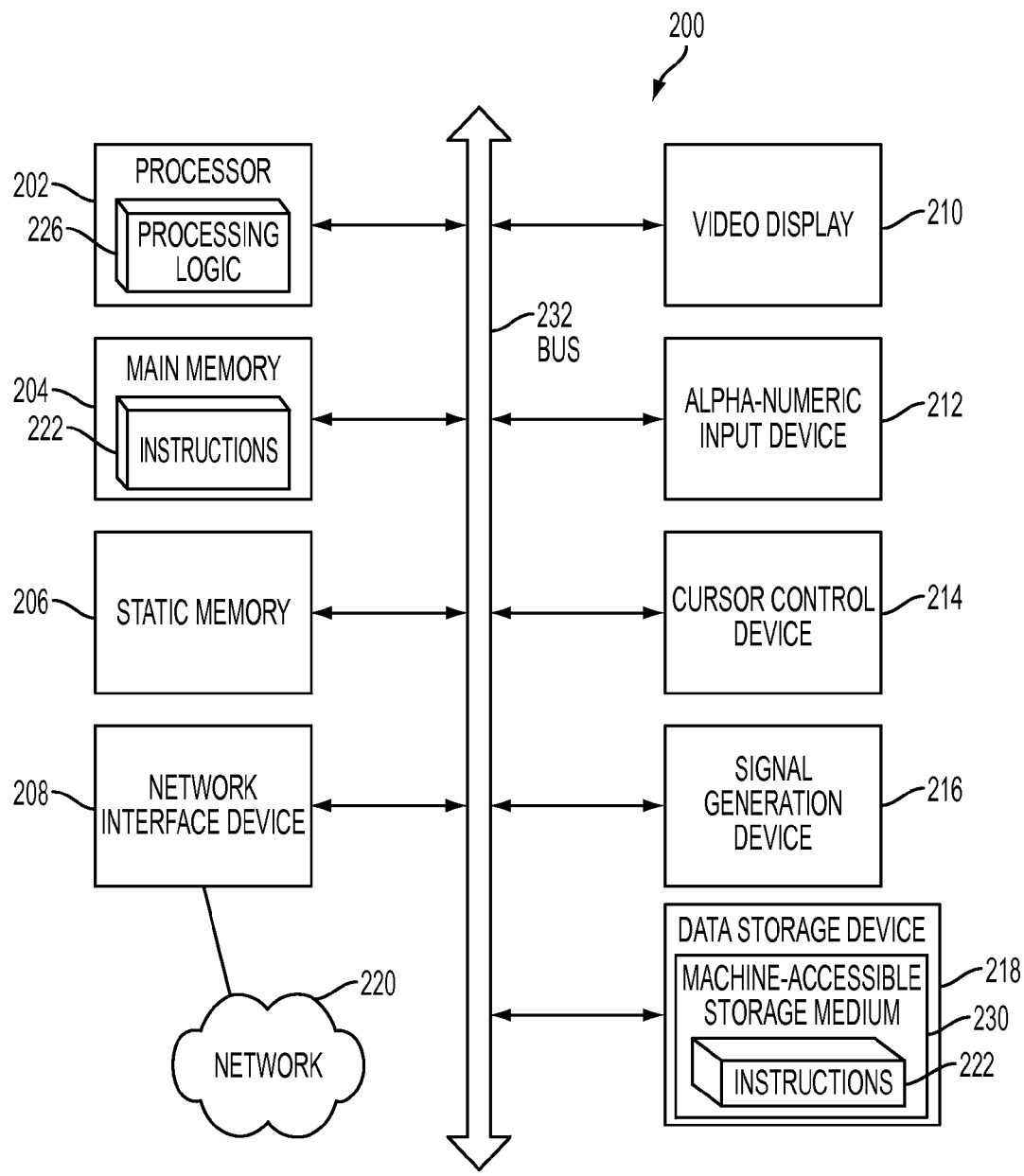
FIG. 2 is a block diagram of a computer that is suitable for use within the social networking system.

FIG. 2 illustrates a diagrammatic representation of a computer 200 that can be used within social networking system 100, for example, as a client computer (e.g., one of client computers 102, 104, 106 shown in FIG. 1), or as a server computer (e.g., Web server 108 shown in FIG. 1). For purposes of this disclosure, reference to a server or a processor, shall be interpreted to include either a single server, a single processor, or multiple servers, or multiple processors.

In particular embodiments, computer 200 may be connected (e.g., networked) to other computers in a LAN, an intranet, an extranet, and/or the Internet. Computer 200 may operate in the capacity of a server or a client computer in a client-server network environment, or as a peer computer in a peer-to-peer (or distributed) network environment. Computer 200 may be a personal computer (PC) 104, a tablet PC 102, a handheld device 106, a set-top box (STB), a Personal Digital Assistant (PDA), a web appliance, a server, a network router, a switch or bridge, or any computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

The exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

Processing device 202 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 202 may also be one or more special-purpose processing devices such as an application specific integrated circuit (ASIC), a field programmable gate array (FPGA), a digital signal processor (DSP), network processor, or the like. Processing device 202 may be configured to execute processing logic 226 for performing various operations and steps discussed herein.

Computer 200 may further include a network interface device 208. Computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

Data storage device 218 may include a non-transitory computer-accessible storage medium 230 (also known as a non-transitory computer-readable storage medium or a non-transitory computer-readable medium) on which is stored one or more sets of instructions (e.g., the method steps embodied by a search & communication module 222) embodying any one or more of the methodologies or functions described herein. Search & communication module 222 may also reside, completely or at least partially, within main memory 204 and/or within processing device 202 during execution thereof by computer 200, main memory 204 and processing device 202 also constituting computer-accessible storage media. Search & communication module 222 may further be transmitted or received over a network 220 via network interface device 208.

While computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" shall also be understood to include any medium that is capable of storing, encoding or carrying a set of instructions for execution by the computer and that cause the computer to perform any one or more of the methodologies of the present invention. The term "computer-accessible storage medium" shall accordingly be understood to include, but not be limited to, solid-state memories, optical and magnetic media, etc.

Exemplary System Operation

Exemplary User Pages

Figure 3:
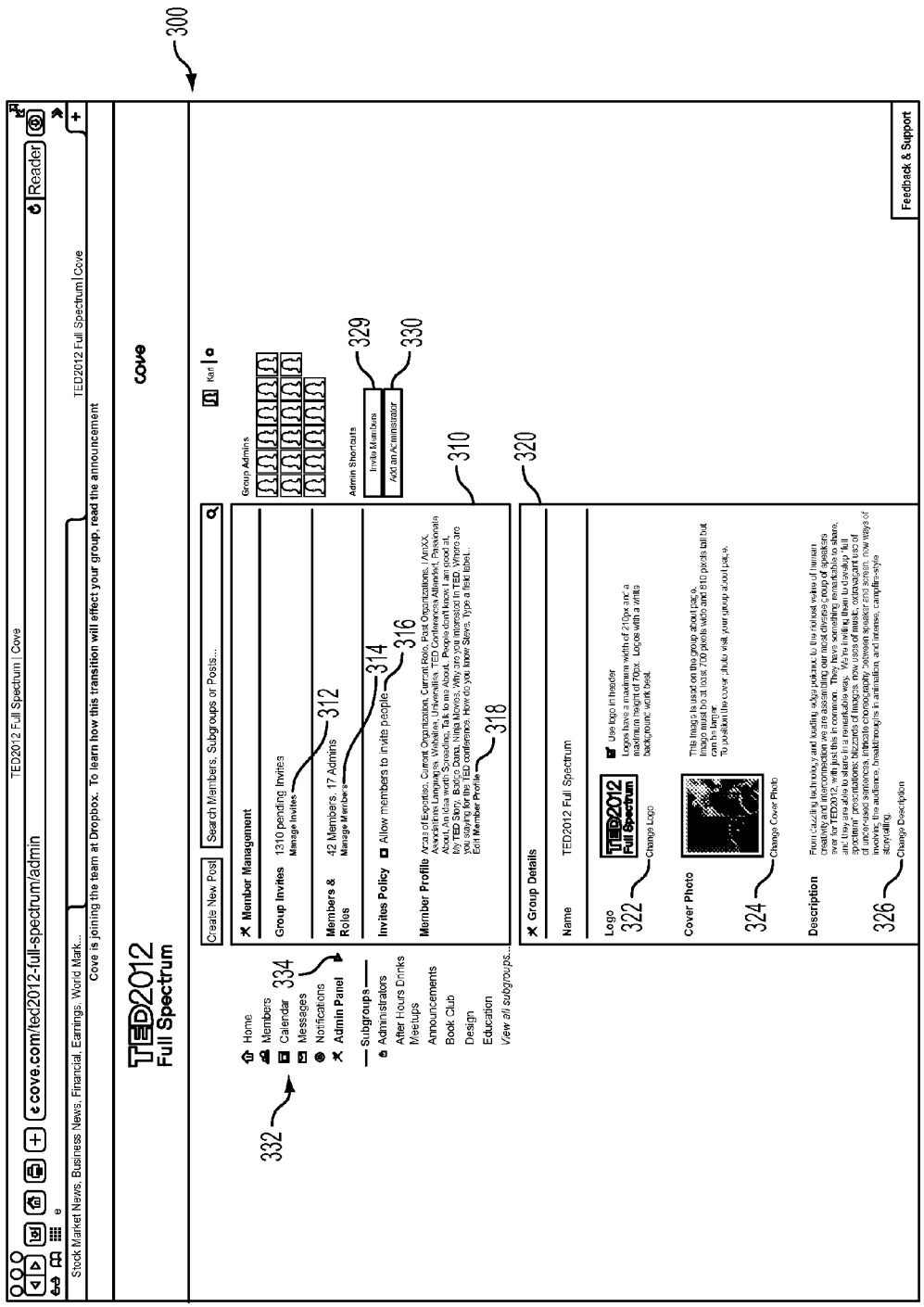
FIG. 3 is a screen display according to a particular embodiment that shows Member Management and Group Details portions of a page on a social networking site according to a particular embodiment.

An exemplary user interface for a particular social networking site according to a particular embodiment is shown in FIGS. 3-10. FIG. 3 illustrates a Member Management section 300 of an Administration Panel 302 for a TED2012 user group. This page is initially displayed to a user (in this case a user with administrator rights) when the user sets up a new group on social networking system 100. This page includes, for example, a Member Management section 310 and a Group Details section 320. Member Management section 310 allows the administrator of the group to manage invitees by selecting a "manage invites" link 312, change the roles served by the group's members (e.g., provide members with administrator rights) by selecting a "manage members" link 314, change the group's invitee policy by selecting a "allow members to invite people" check box 316, and edit the group's member profile requirements by selecting a "edit member profile" link 318. Group Details section 320 allows the administrator to enter and display information about the group. For example, in various embodiments, the group administrator can add or change the group's logo by selecting a "change logo" link 322, add or change the group's cover photo by selecting a "change cover photo" link 324, and add or edit the description of the group by selecting a "change description" link 326. This page also enables administrators to invite new members to the group by selecting a "invite members" button 329 and to add new administrators to the group by selecting "add an administrator" button 330. A navigation panel 332 is positioned on a side of the page and allows the administrator and members of the group to navigate to different pages associated with the group. Navigation panel 332 is displayed on each page and provides an indicator 334 that notifies the user which page is active.

Figure 4:
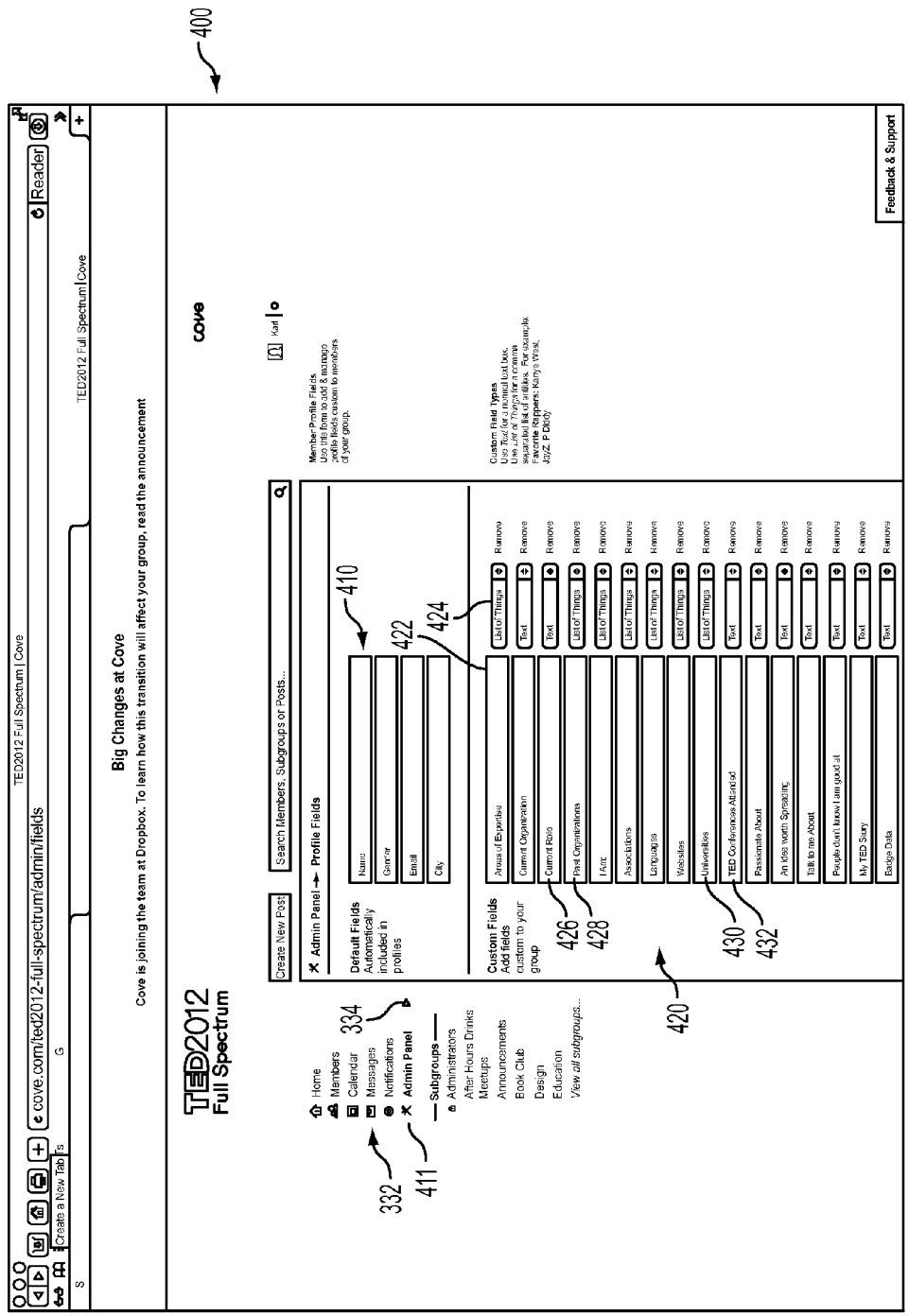
FIG. 4 is a screen display according to a particular embodiment that shows a profile template according to a particular embodiment. The profile template is shown within the context of an administration panel that may be used to modify the fields that are included within a particular group profile.

FIG. 4 illustrates an Edit Profile Fields 400 page. Edit Profile Fields page 400 displays default fields 410 for the member profile for a particular group and enables an administrator or a member with administrator rights to add custom fields 420 to the group's member profile, or to remove custom fields from the profile. In various embodiments, default fields 410 are fields that are common to every user group and that may, for example, be pre-populated when a new invitee creates a profile for a particular group. In various embodiments, default fields may include the invitee's name, gender, e-mail address, city of residence and any other suitable member information that would be the same across all groups.

In various embodiments, custom fields 420 are administrator-defined fields that are specific to the group. For example, for a TED2012 conference group, group-specific fields may include: (1) an area of expertise field 422; (2) a current organization field 424; (3) a current role field 426; (4) a past organization field 428; (5) a universities field 430; (6) a TED conferences attended field 432; and (7) other suitable fields that are related to the TED2012 conference group. The administrator-defined fields allows the group administrator to build a member profile template that best fits the purpose of the group and that provides searchable information for finding members.

Figure 5:
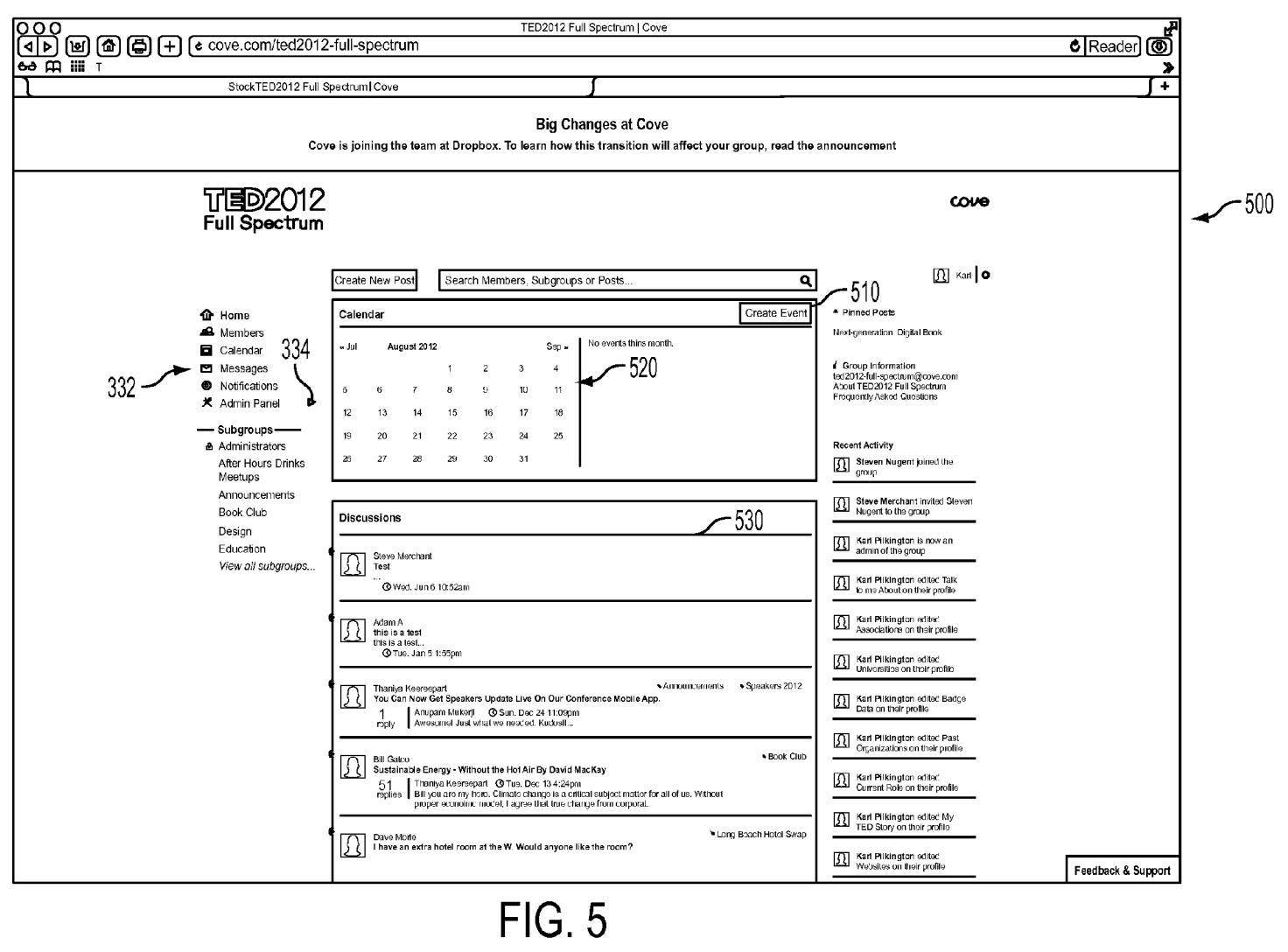

FIG. 5 illustrates a Home page 500 for the TED 2012 group. This page: (1) contains a create event button 510 that enables the group's members to create events for the group; (2) displays a calendar 520 that displays events related to the group; and (3) provides a discussions post section 530 that lists entries created by the group's members.

Figure 6:
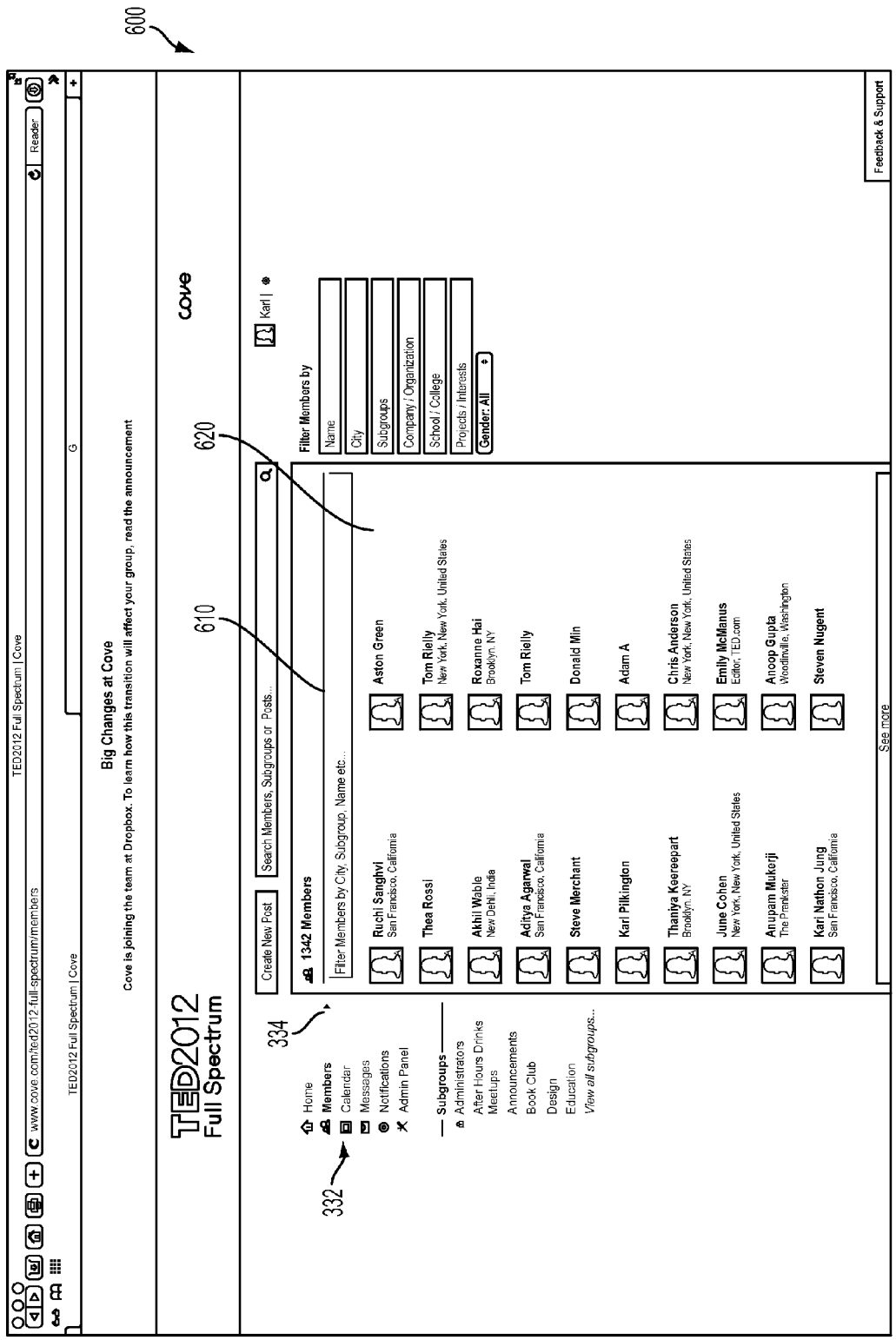
FIG. 6 is a screen display according to a particular embodiment that shows a members page for the group whose home page is shown in FIG. 5.

FIG. 6 illustrates a Members page 600 according to a particular embodiment. This page includes a search field 610 for filtering group members and displays a listing 620 of all members within a group. In various embodiments, members can use this page to perform a free text search using search field 610 to filter the listed members, as well as create new posts that are listed in discussion post section 530 (FIG. 5).

Figure 7A:
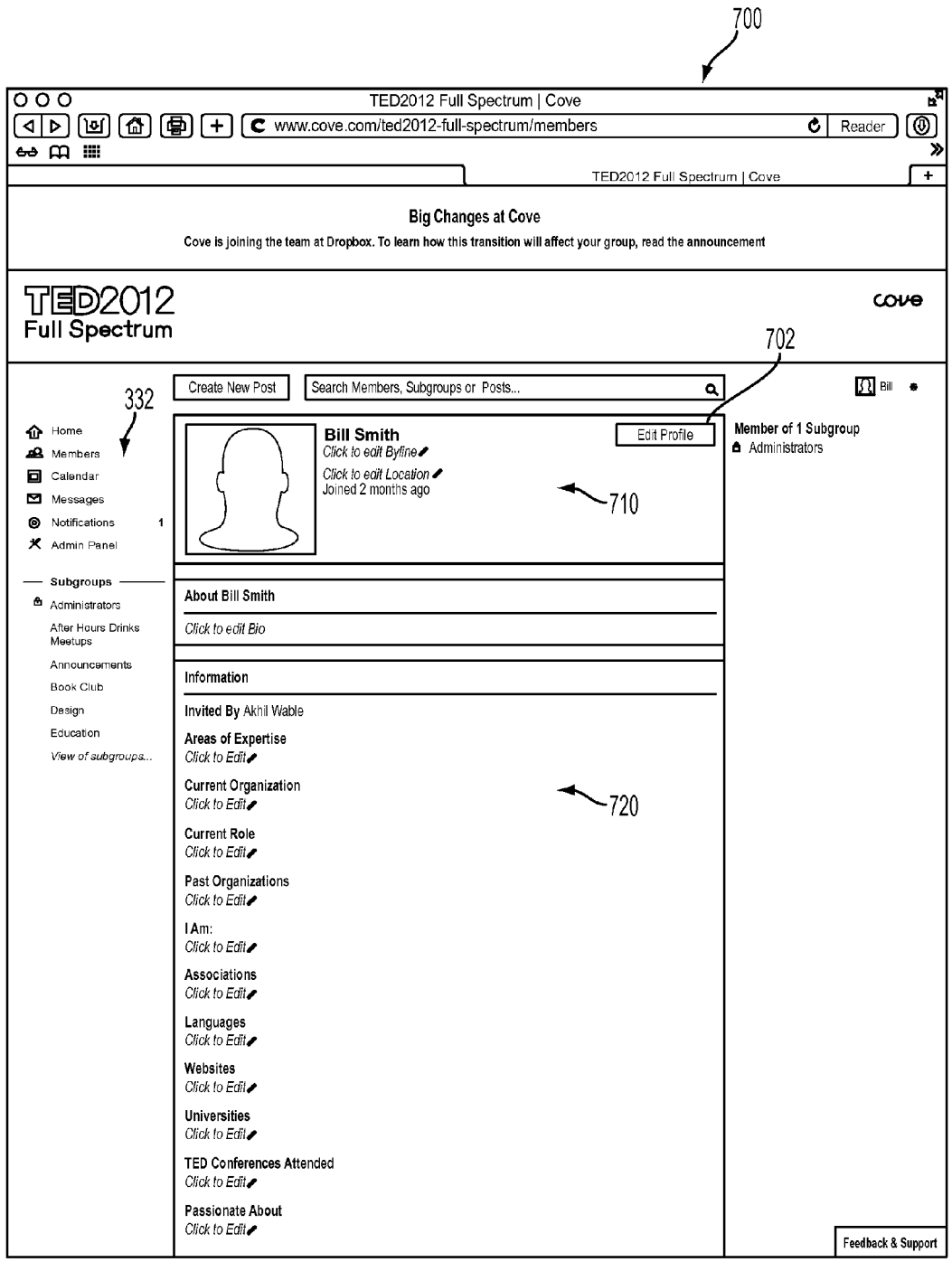
FIG. 7A is a screen display of a user's member page for use in conjunction with the group whose home page is shown in FIG. 5.
Figure 7B:
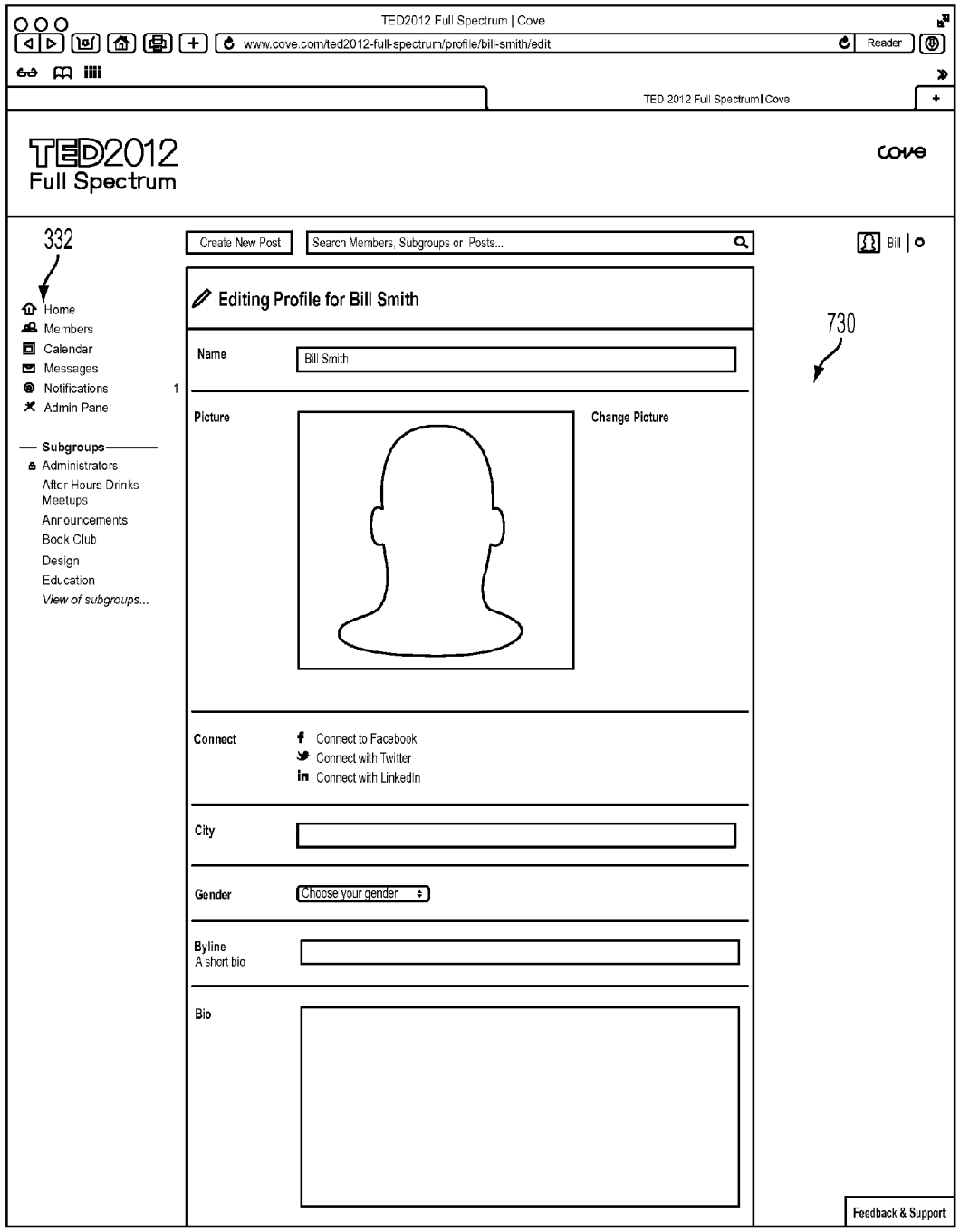
FIG. 7B is a screen display of the user member page of FIG. 7A in an edit mode.

FIG. 7A illustrates a Member Profile page 700. As may be understood from this figure, Member Profile page 700 may include a default member profile section 710 and a custom member profile section 720. Default member profile section 710 reflects default fields 410 in the member profile template of FIG. 4. In various embodiments, the system may auto-populate the fields since these are based on information that the user entered when joining the social networking site. Custom member profile section 720 corresponds to custom fields 420 in the member profile template of FIG. 4. In various embodiments, the user can select individual fields to edit, or the user can select "edit profile" link 702, which brings the user to Profile page 730 illustrated in FIG. 7B. Profile page 730 allows the user to edit all fields in their profile. In this way, the user can tab from field-to-field entering data to create their group-specific profile.

FIGS. 8A-8E, 9 and 10 collectively demonstrate a search process available in conjunction with various embodiments of the social networking site. The search process allows the user to enter a search 811 into a search box 810, and the system automatically generates a list of suggested search term/facet combinations that the user may select, at any time, to filter the list of members displayed below the search box. In various embodiments, the system will not alter the current displayed list of members until the user either selects one of the proposed search term/facet combinations, or presses their "enter" button. The system provides the list of suggested search term/facet combinations by searching one or more databases for the search term in combination with one or more non-user specified facets. In various embodiments, a facet may correspond to one of the fields in the member profile template.

Once the system identifies search results in the one or more databases that are associated with the non-user specified facets, the system ranks the results to determine which of the results should be displayed to the user as suggested search term/facet combinations. In various embodiments, the system ranks the results by counting the number of times the search term/facet combination is found in the databases. The system then displays the four highest ranked search term/facet combinations.

In various embodiments, the system may search one or more databases that contain member profile data. In other embodiments, the system may search the profile databases in combination with a collaborative knowledge database that is built on structured data harvested from many sources, including individual wiki contributions. One such suitable database is Freebase, provided by Google, Inc. In some embodiments, the system may make a data call to the Freebase database using an API, and in various other embodiments, the Freebase database may be downloaded and stored locally on the system. It should be understood from reference to this disclosure that other suitable ranking systems may be used with the present search methodology.

The above described search methodology is advantageous when a user wants to search for a single term against data associated with multiple facets. That is, the present system allows a user to enter a single search term in one location, instead of having to enter the term in more than one location or using a complicated search string. Moreover, the user does not need to take the extra step of specifying a particular facet for the search since the system will conduct the search in data categories associated with all of the non-user specified facets. In alternative embodiments, the user could perform a traditional facet search by entering the search term in one of the search boxes 813 (FIGS. 8A-8E) that is associated with a respective facet. In this case, the system will only search the database for profiles that contain the search term with the associated facet. In other embodiments, if the user presses their enter button without selecting a particular system suggested search term/facet combination, the system display a list of all members whose profile contains the search term in any of the non-user specified facet categories.

Figure 8A:
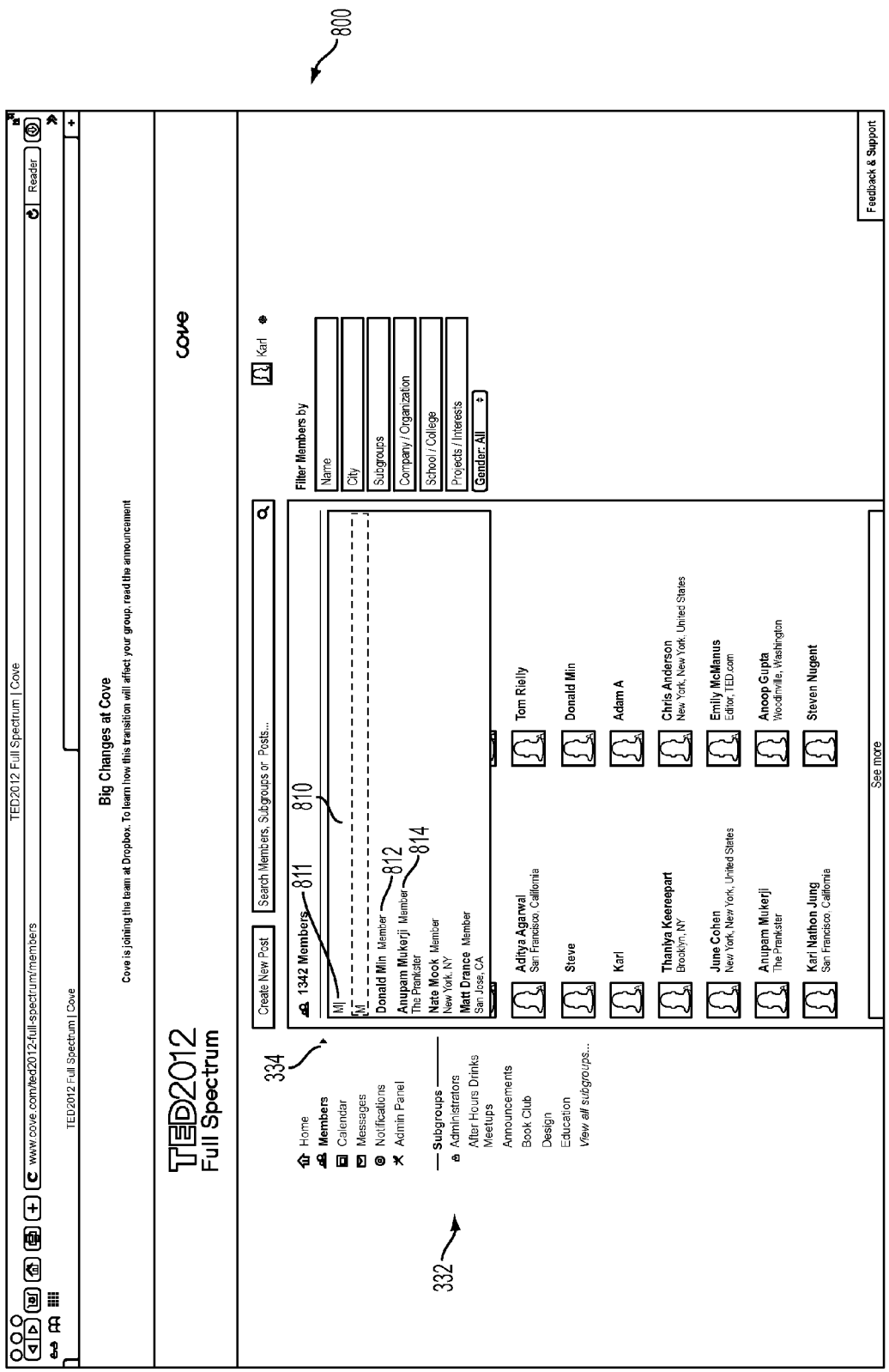
Figure 8B:
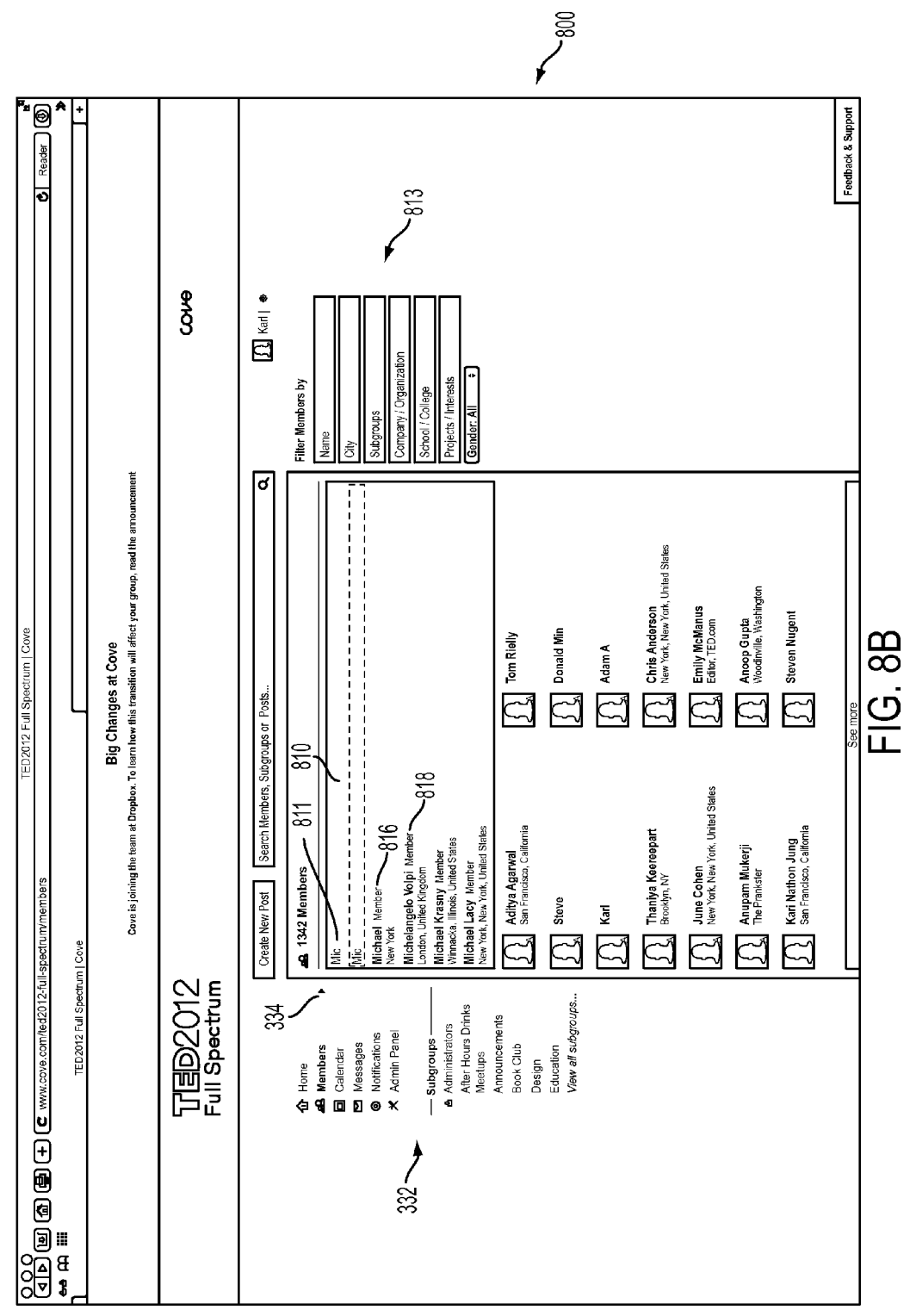
Figure 8C:
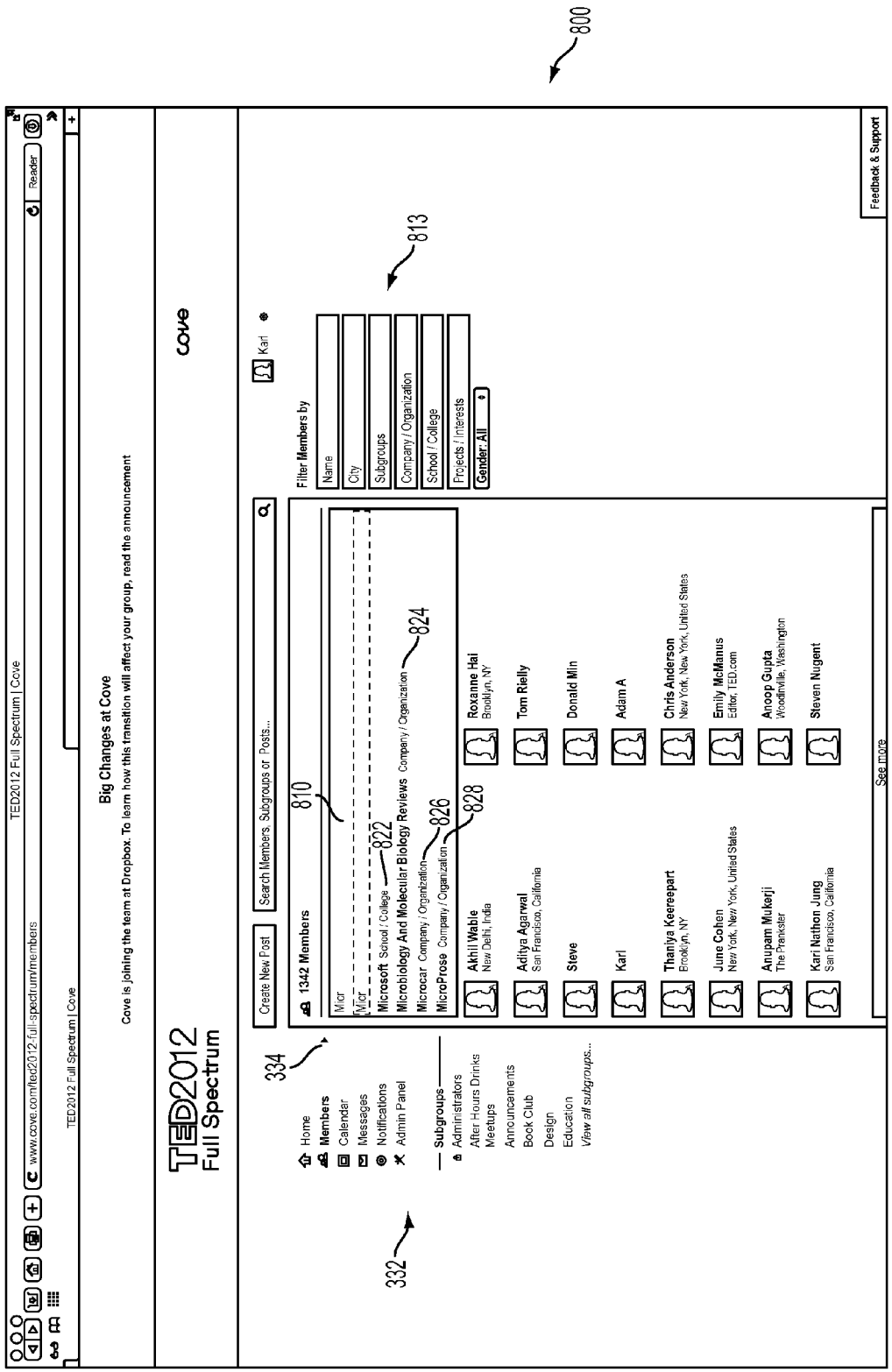
Figure 8D:
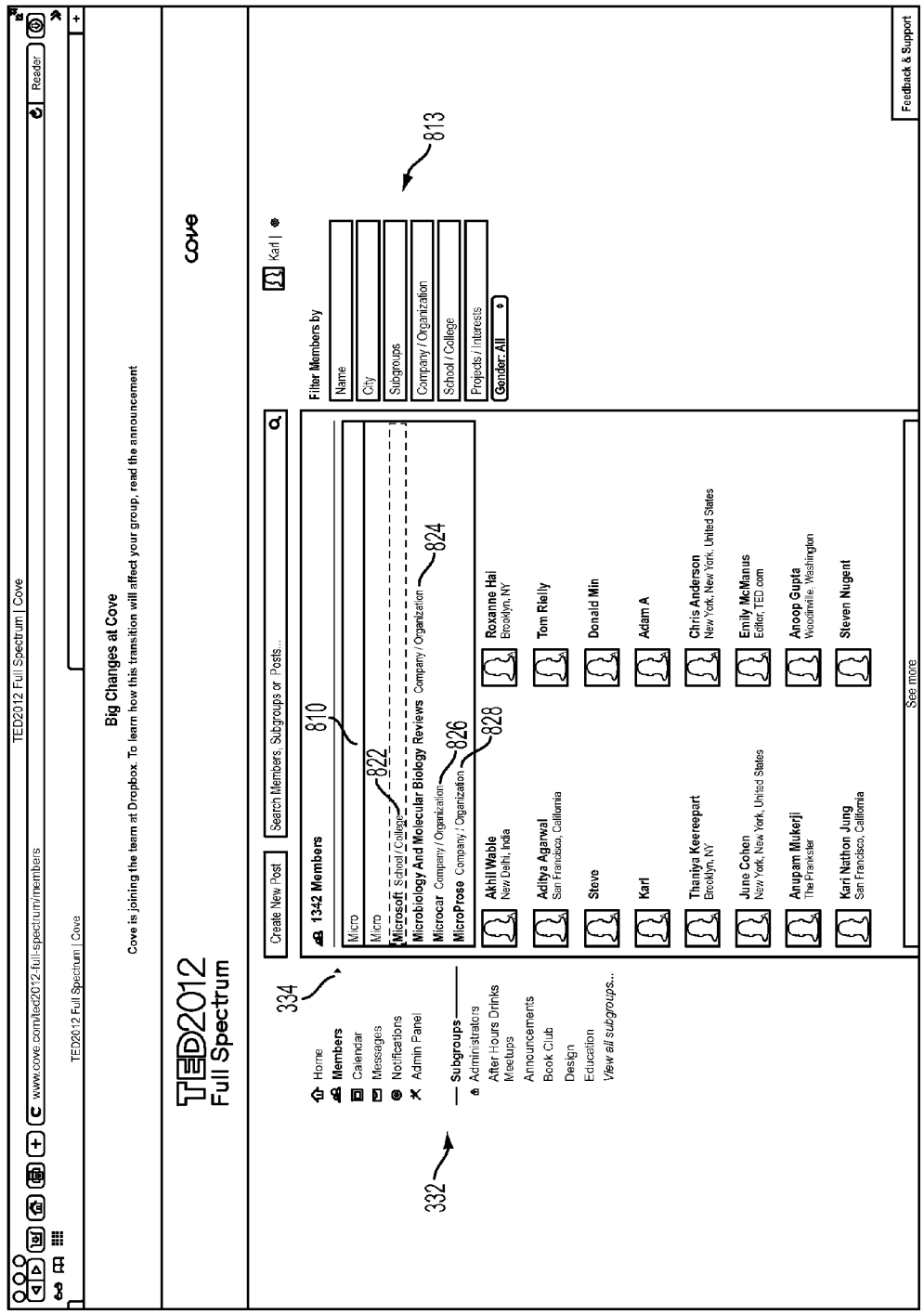

The following discussion provides a brief example of a search in accordance with the search methodology described above. Referring to FIG. 8A, a Member page 800 is illustrated with the beginning of a search 811 typed into search box 810. This particular example illustrates search 811 being performed with one letter, an "M". Initially, the system returns four suggested search term/facet combinations that happen to be potential names of members. FIG. 8B displays the Member page 800 again, but this time search 811 is further developed and includes the additional letters of "I" and "C". Each time additional letters are added to search 811, the system imitates a new search in the database(s) and displays the highest ranked suggested search term/facet combinations. Thus, the displayed search term/facet combinations change as more letters are added to search 811. Referring to FIGS. 8C-8D, as search 811 is further developed, the system begins to return suggested search term/facet combinations that include company names and school names.

At this point in the search, the system either receives (1) the user's selection of the search term/facet combination from the displayed suggestions, or (2) additional letters that are added to original search 811, or the user presses their enter button and the system searches all non-user specified facets in the database(s) for matches. If the user selects one of the suggested search term/facet combinations, the system searches the profile database and identifies each user whose profile contains the selected search term in the associated facet. Next, the system displays the members that were identified. Thus, referring to FIGS. 8D-8E, if the user selects the term/facet combination "Microsoft—School/College", the system displays all users that listed "Microsoft" as a school/college in their profile. Additionally, the system displays a search filter button 830 on member page 800 to indicate to the user that the member list is filtered by the search term/facet indicted by the filter button 830 (e.g., "Microsoft—School/College").

Figure 8E:
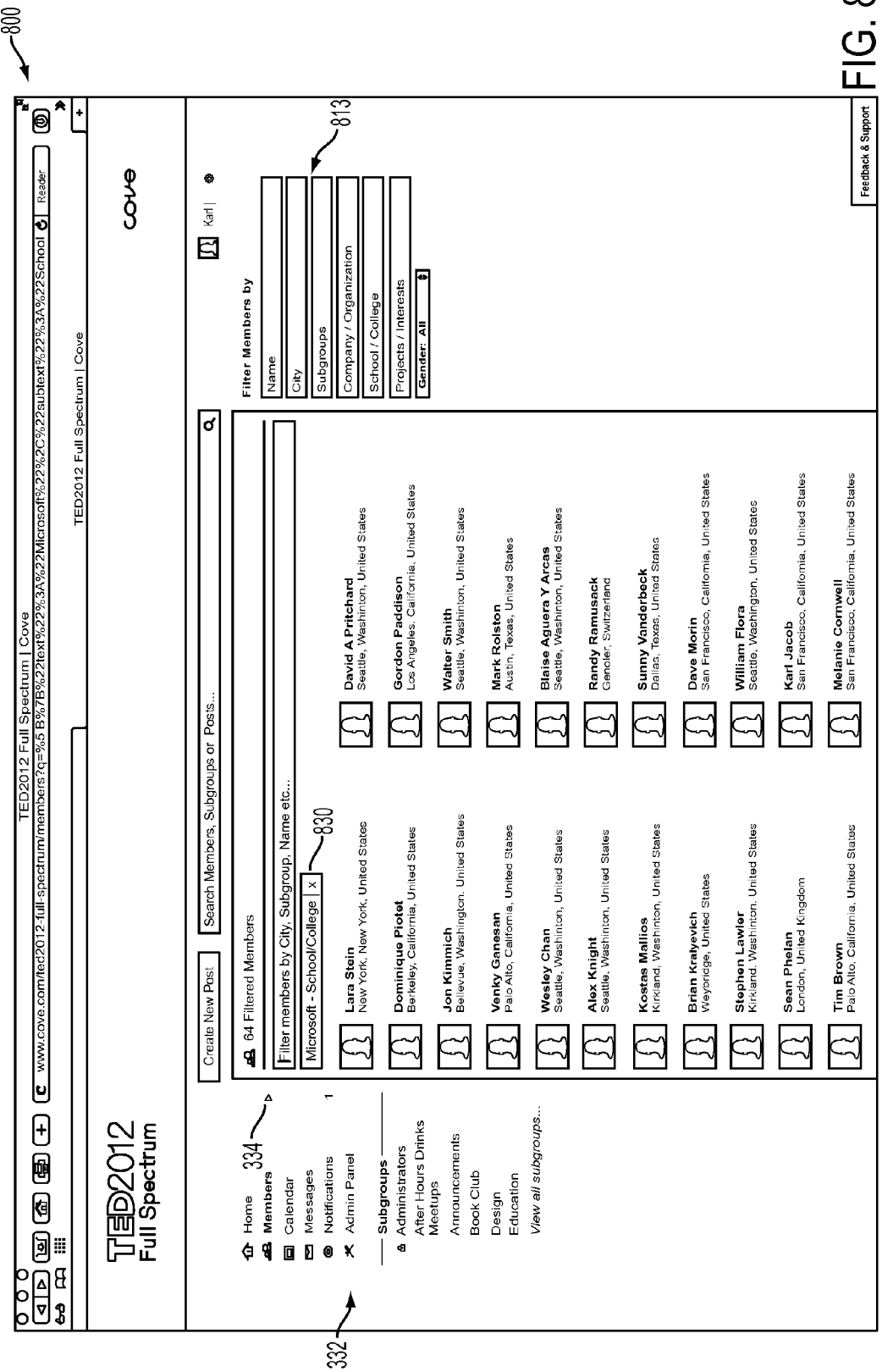
Figure 9:
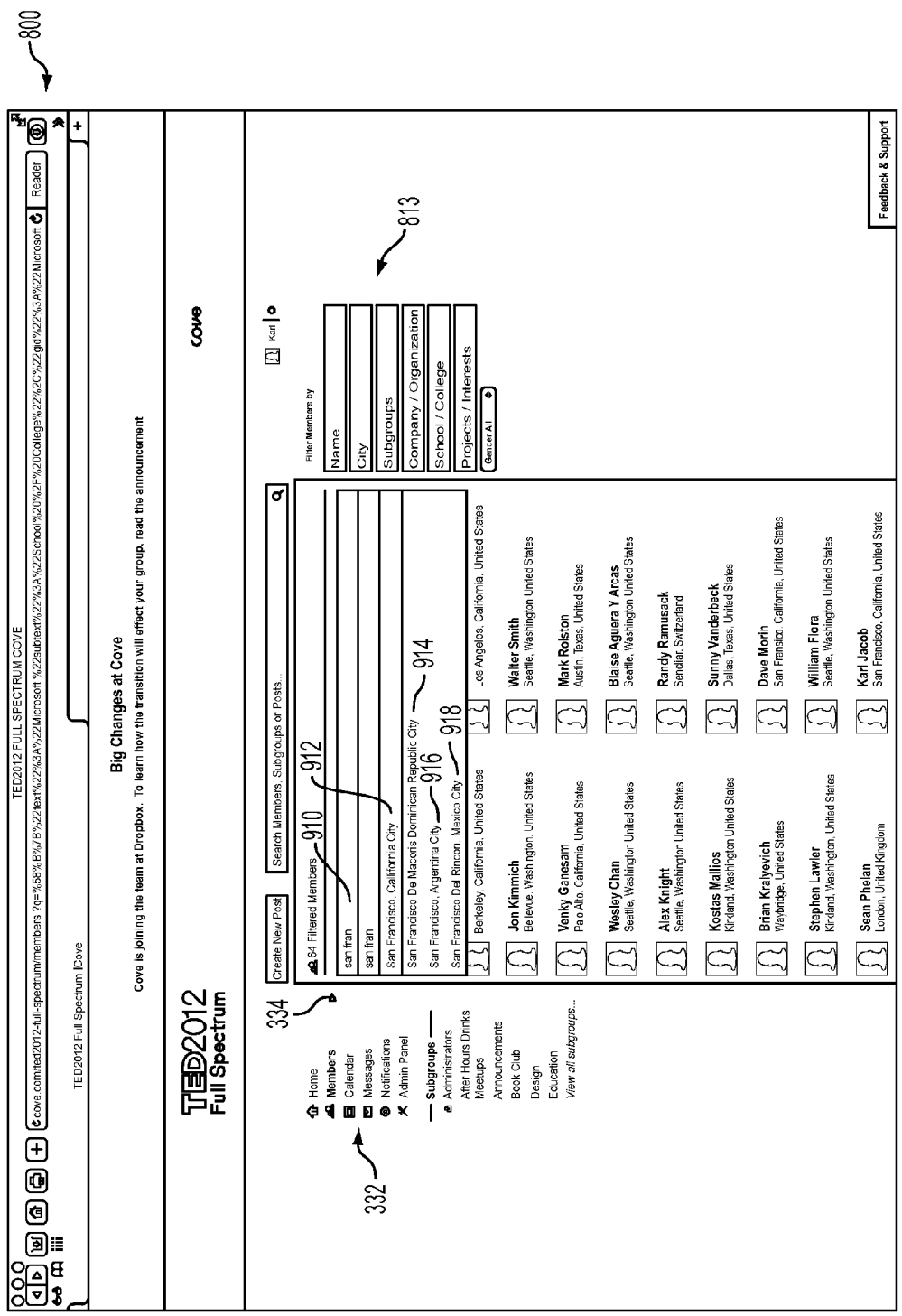
FIG. 9 is a screen display according to a particular embodiment that shows a search on a secondary search term.
Figure 10:
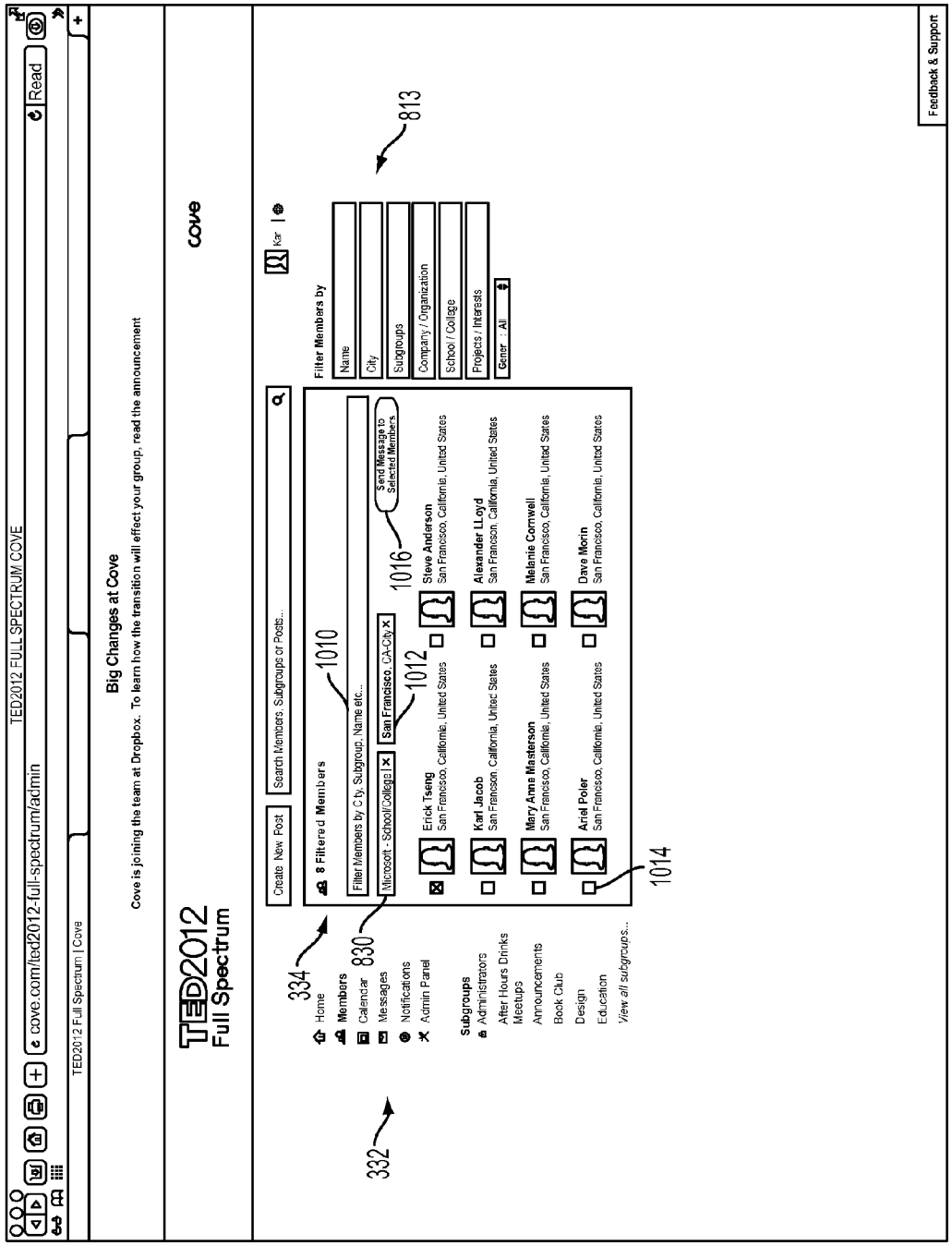
FIG. 10 is a screen display according to a particular embodiment that shows a filtered listing of group members that is defined by the searches of FIGS. 8A-8E and 9.

If, instead, the user adds additional letters to further develop his search, the system repeats the above described search methodology and returns new suggested search term/facet combinations. FIG. 9 displays Members page 800 with a secondary search 910 performed on the list of members that resulted from the selection of the search term/facet combination "Microsoft-School/College" in FIG. 8E. Referring to FIG. 10, once the user selects a second search term/facet combination, a second search filter button 1012 appears adjacent to search filter button 830 to notify the user that the member list has been filtered by another term.

In various embodiments of system 100, when a user performs a search, the system may search one or more user profiles associated with each user on the social networking site, instead of only searching a user profile associated with a particular group. In this way, the user is not limited to searching member profiles for a particular group.

Exemplary Operation

Figure 11:
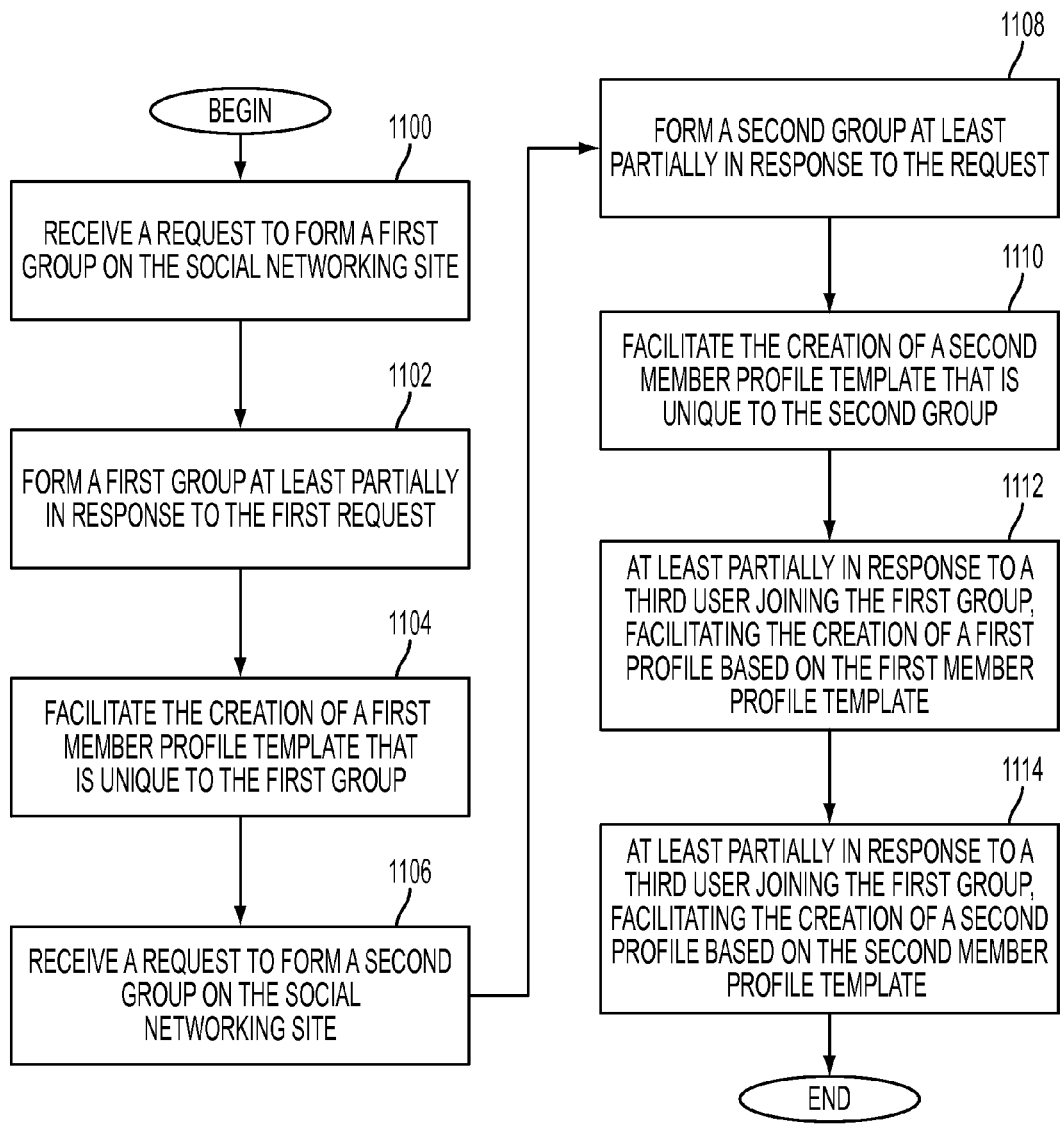
FIG. 11 is a flow chart depicting an exemplary operation of the social networking system of FIG. 1.

Web server 112 may alone, or in combination with other computers, processors or servers, perform the method steps of FIG. 11 (e.g., a computer-implemented method). It should be understood by reference to this disclosure that these methods describe exemplary embodiments of the method steps carried out by the present system, and that other exemplary embodiments may be created by adding other steps or by removing one or more of the method steps described in FIG. 11.

When a user of the social networking site joins the group, they are asked to create a group specific profile based on the group specific member profile template. In some embodiments, creating a new profile is a condition for joining a group. Thus, when a user joins multiple groups on the social networking site, they establish a new profile for each group they join.

FIG. 11 depicts an exemplary method for forming multiple groups on a social networking site, where each group has its own group specific member profile template. Beginning at step 1100, the social networking system receives a request to form a first group on a social networking site. For example, when a user of the social networking site decides to create a group, the user makes a request to the system to form the new group. Thus, in various embodiments, the system may require the member to submit information regarding the new group. In some embodiments, the will appoint the user making the request to form the group as the administrator for the group. At step 1102, social networking system 100 forms a first group in response to the user's request. At step 1104, the social networking system enables the creation of a first member profile template that is unique to the first group. In some embodiments, the social networking site may require the administrator to create a member profile template that each member of the group is required to complete at the time they join the group.

At step 1106, social networking system 100 receives a request to create a second group on the social networking site. The second request may be from the same user that made the first request, or from a different user that desires to create a new group. At step 1108, social networking system 100 forms a second group in response to the request. In various embodiments, the user requesting the formation of the group will initially be appointed the administrator for the second group. It should be understood that a member may be appointed an administrator of more than one group. At step 1110, social networking system 100 enables the creation of a second member profile template that is unique to the second group. In various embodiments, social networking site 100 may require that the member profile template for the second group be created prior to any members being invited to join the group.

At step 1112, in response to a third user joining the first group, social networking system 100 enables the creation of a first profile based on the first member profile template. In various embodiments, when a third user of the social networking site joins the first group, the system requires that the user create a group profile based on the member profile template for the first group. At step 1114, in response to the third user joining the second group, social networking system 100 enables the creation of a second profile based on the second member profile template. Thus, following the example above, when the user who joined the first group also joins the second group, in various embodiments, the social networking system 100 requires the user to create a new member profile for the second group based on the second group member profile template.

In various embodiments, each member profile for each group contains common default fields and administrator defined custom fields. For example, the default fields may include the member's name, city of residence, e-mail address, etc. The administrator-defined fields may include field that are specific to the group. The system may auto-populate one or more of the common default fields based on information that the user entered when joining the social networking site. Alternatively, the system may populate one or more of the common default fields based on information that the user entered while establishing their profile for another group. In still other embodiments, each group profile is unique to the group that it is associated with. In various embodiments, when a user joins a user group, the system requires the user to create a group profile that is based on a particular member profile template for that group. In this way, the system assures that the fields for group profiles for a particular group remain uniform across all members. In certain embodiments, the member profile template for each group is established by the group's administrator when the group is initially created.

Exemplary User Experiences

The operations of exemplary embodiments of the system are perhaps best understood by reviewing particular examples. The following examples describe an exemplary experience of a group administrator and group members.

Administrator Experience

A group administrator is initially assigned administrator rights when a group is created on the social networking site. That is, in some embodiments, the creator of the group is appointed as the group's administrator. Thus, for the TED2012 Group, once the group is created and the administrator logs into the TED2012 group, the administrator creates a description of the group. For example, referring again to FIG. 3, the administrator adds the group logo at 322, adds a group cover photo at 324 and drafts a group description at 326. Moreover, the administrator also creates the unique fields necessary for the members of the group to create a member profile. To do this, the administrator selects "edit member profile" link 318 to open the member profile template as discussed below.

Referring to FIG. 4, once "edit member profile" link 318 is selected, the user's browser opens Profile Fields page 400. On this page, the administrator can customize the fields that appear on the group's member profile template. That is, in addition to default fields (e.g., name, gender, email address and city) 410, the administrator can add custom fields 420 that enable users to input information in either a list form or as free text. For example, the administrator may want group members to indicate their areas of expertise in the form a list. In this example, the administrator types "Area of Expertise" in a custom field 422 and selects "list of things" from the format selection menu 424. In another field 426, the administrator may want group members to describe their role in an organization. Thus, the administrator types "Current Role" in custom field 426 and selects "text" in format selection menu 428. The administrator may select "Remove" 430 beside a custom field to remove it, or add more custom fields. Once the administrator completes making changes to the template, the administrator selects "Save Changes" (not shown) to save the member profile template. The administrator may then invite members to join the group by selecting "invite members" button 330 on member management page 300 (FIG. 3). The profile template is now visible to group members as members accept their invitation to join the group.

Group Member Experience

A user of the social networking site receives an e-mail invitation from the administrator of the TED2012 group to join the group. After accepting the invitation and joining the group, the group member can set up their member profile (this may be optional or mandatory). The member profile template is specific to the TED2012 group only.

Once the user joins the group, he can set up his profile, participate in group discussions and access Members page 600 (FIG. 6). For example, once the member accepts the invitation to join the group, he may be directed to member profile page 700, which is shown in FIG. 7A. From this page, the member can review his default profile data in section 710. In various embodiments, the member can edit his default profile data by, for example, selecting a "click to edit by line" link 704, which allows the user to change the information associated with that link (e.g., the name that is displayed in his profile). The member may also select the "click to edit location" link 706 to change the location displayed in his profile. To expedite the creation of a profile, the member may also select "edit profile" link 702, which will take the member to edit profile page 750. On this page, the member can tab between information boxes to add the required information to his profile. Once the member completes the requested information to form his profile, the member can select a "save changes" button (not shown) to save his profile to the system. In various embodiments, this profile is unique to the TED2012 group and is only used for this group.

Still following the example discussed above, the user who just joined the TED2012 group also receives an invitation to join a group dedicated to the preservation of wildlife and nature. After accepting the invitation and joining the group, the member is able to set up a member profile that is completely different and separate from the member profile seen by the TED2012 group. Some of the fields for the wildlife preservation group may be the same as those in the TED2012 group. For instance, both group profiles include past organizations and languages spoken. Because the member created his TED2012 profile first, in some embodiments, the social networking site may auto-populate information from that profile in the common fields of the member profile template for the preservation of wildlife and nature. However, in various embodiments, the member may edit the information in these fields to make each profile more specific to the group. Once the user joins the group and completes the profile, he can also participate in discussions and see members in this group, but his member profile for this group will remain separate from the TED2012 group member profile.

Search Experience

Referring once again to FIG. 6, search box 610 allows a member to search for other members that have common interests. For example, the member of the group may want to find all members that attended the "Microsoft" college. Thus, the member may conduct a search by typing in a free-text word (e.g., "Microsoft") to see all members whose profile lists "Microsoft" as a college/university.

Returning to the example and referring to FIG. 8A, a member would like to identify other members of the TED2012 group who attended the Microsoft School and lives in his city. In search field 810 on Members page 800, the member begins typing the letter "M". System 100 begins to display a list of suggested search term that begin with the letter "M" and that are associated with one or more system-designated facets. As described above, the system searches one or more databases for all data that begins with the letter "M" and that is associated with one of the system-designated facets. The system then ranks the results and displays the four highest ranked results. Thus, for example and still referring to FIG. 8A, the names "Donald Min" 812 and "Anupam Mukerji" 814 are returned in addition to two other names. Referring to FIG. 8B, as the member adds additional letters to the search term (e.g., "M", "I" and "C"), the system returns new suggested search terms that begin with the letters "M", "I" and "C". In this example, one of the names returned is "Michael" 816, which refers to all members having the name "Michael" and the name "Michelangelo Volpi" 818.

As the member continues to develop the search by adding additional letters to the search term (e.g., by typing "R" and "O" after "MIC"), the system (1) identifies search terms that begin with the letters "MICRO" in combination with the system-specified facets, (2) ranks the results based on the number of times the terms appear in the one or more databases being searched, and (3) displays the four highest ranked search term/facet combinations. Referring to FIG. 8C, the system provides the highest ranked results as follows:

| Search Term | Facet |
| --- | --- |
| Microsoft - 822 | school/college |
| Microbiology and Molecular Biology Reviews - 824 | company/organization |
| Microcar - 826 | company/organization |
| Microprose - 828 | company/organization |

As illustrated in FIG. 8D, the member selects the search term/facet combination "Microsoft—School/College" because he is searching for group members that attended "Microsoft" the school. Referring to FIG. 8E, the system displays a list of members who specified Microsoft as their "School/College". Moreover, a button 830 displaying "Microsoft—School/College" appears below the search box 810. Button 830 provides an indication to the member that the member list has been filtered by the term/facet "Microsoft—School/College". Should the member wish to remove this filter, in various embodiments, he could select button 830 to remove the "Microsoft" filter.

At this point, the member would like to know if any of the members who attended Microsoft the school are also located in San Francisco, Calif. Thus, referring to FIG. 9, the member can begin typing the letters "San Fran" in search field 910, which returns various suggested search term/facet combinations such as:

| Search Term | Facet |
| --- | --- |
| San Francisco, California - 912 | City |
| San Francisco De Macoris, Dominican Republic - 914 | City |
| San Francisco, Argentina - 916 | City |
| San Francisco Del Rincon, Mexico - 918 | City |

In this example, the highest ranked search term/facet combinations all contain the facet "city". The member selects "San Francisco, Calif.—City" since he is looking for members who attended Microsoft the school and who also live in the city of San Francisco, Calif. Referring to FIG. 10, when "San Francisco, Calif.—City" is selected, another filter indication button 1012 appears adjacent the Microsoft button 830, this one displaying "San Francisco, Calif.—City". Moreover, the member list filters even further to display only TED2012 members who live in San Francisco and who attended Microsoft the school. The member can now direct messages through e-mail, a wall post, instant message, through an invite or any other suitable communication means to specific members that meet this search criteria by checking a selection box 1014 next to each member, and by selecting a "send message to selected members" button 1016. In various embodiments, the selection boxes may not be used. Instead, a message is sent to all of the members of the filtered result by selecting the "send message to selected members" button 1016. In various other embodiments, other means may be used to individually select members to include in a private communication. For example, clicking on a member may highlight that member, where the member can select one or members to include in the communication. Thus, the system provides an efficient means searching for members that meet one or more specific criteria and facilitating a communication to a selected subgroup of those members.

CONCLUSION

Many modifications and other embodiments of the invention will come to mind to one skilled in the art to which this invention pertains having the benefit of the teachings presented in the foregoing descriptions and the associated drawings. It should also be understood that, although various embodiments are described above as using a structured database, any other suitable data structure can be used to allow for free-text searches.

In light of the above, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

The invention claimed is:

1. A computer-implemented method of providing a user of a social networking site the ability to create a unique profile for each group the user is a member of, comprising the steps of:

receiving, from a first user, a request to form a first group, in response to the request, forming, by at least one processor, a first group on the social networking site that allows users of the social networking site to join the first group;

enabling, by the at least one processor, the creation of a first member profile template that is unique to the first group;

receiving, from a second user, a request to form a second group, in response to the request, forming, by at least one processor, a second group that allows users of the social media site to join the second group; and enabling the creation of a second member profile template that is unique to the second group;

in response to a third user joining the first group, enabling the creation of a first profile based on the first member profile template; and in response to the third user joining the second group, enabling the creation of a second profile based on the second member profile template, wherein the first profile differs from the second profile.

2. The computer-implemented method of claim 1, wherein the first member profile template comprises a first group of fields that are unique to the first group, and the second member profile template comprises a second group of fields that are unique to the second group.

3. The computer-implemented method of claim 2, wherein the first group of fields further comprises:

at least one default field that is common to both the first member profile template and the second member profile template, and a plurality of custom fields that is unique to the first group.

4. The computer-implemented method of claim 3, wherein the at least one default field is a name field.

5. The computer-implemented method of claim 3, wherein the at least one default field is an e-mail address field.

6. The computer-implemented method of claim 3, wherein the custom fields for the first member profile template are user-defined and created when the first user forms the first group.

7. The computer-implemented method of claim 3, wherein the at least one default field is automatically populated based on information a user enters when joining the social networking site.

8. A computer system for allowing users of a social networking site to create a unique member profile for each group that the user is a member of, the computer system comprising at least one processor configured to:
   receive, from a user of the social networking site, a first set of profile information based on a first group profile template that the user completes when joining the first group on the social networking site,
   generate, for the user, a first group profile based on the first set of profile information, wherein the first group profile for the user is unique to the first group,
   receive, from the user, a second set of profile information based on a second group profile template that the user completes when the user joins a second group on the social networking site, and
   generate, for the user, a second group profile based on the second set of profile information, wherein the second group profile for the user is unique to the second group, wherein the member profile for the user for the first group can only be viewed by members of the first group.

9. The computer system of claim 8, wherein the first set of profile information and the second set of profile information contain common data.

10. The computer system of claim 8, wherein the at least one processor is further configured to allow the user to maintain a plurality of group profiles, each group profile based on a respective group profile template, wherein each of the plurality of group profiles contains information that is unique to its respective group.

11. The computer system of claim 8, wherein the first group profile contains a plurality of common fields and a plurality of custom fields that is unique to the first group.

12. The computer system of claim 8, the at least one processor being further configured to allow an administrator of the group to create a member profile template when the administrator creates the group on the social networking site.

13. The computer system of claim 8, wherein all members of the first group complete the same first group profile template.

14. A computer system comprising at least one processor configured to:
   receive, from a user, a first set of information that the user enters into a first profile template for use in establishing a first profile for the user within a context of a first user group on a social networking site;
   receive, from the user, a second set of information that the user enters into a second profile template for use in establishing a second profile for the user within the context of a second user group on the social networking site;
   enable the creation of, within the context of the first user group on the social networking site, a first profile for the user based on the first set of information; and
   enable the creation of, within the context of the second user group on the social networking site, a second profile for the user based on the second set of information; and
at a particular time:
   use the first profile for the user within the context of the first user group; and
   use the second profile for the user within the context of the second user group.

15. The system of claim 14, wherein the first profile contains different information from the second profile.

16. The system of claim 14, wherein receiving the first set of information comprises receiving the completed first member profile template from the user when the user joins the first group, and the step of receiving the second set of information comprises receiving the completed second member profile template from user when the user joins the second group.

17. The system of claim 16, wherein:
   the first member profile template comprises a set of default fields and a first set of custom fields that are unique to the first group; and
   the second member profile template comprises the set of default fields and a second set of custom fields that are unique to the second group.

18. The system of claim 14, wherein:
   the first user group further comprises a first set of users of the social networking site,
   the second user group further comprises a second set of users of the social networking site, and
   at least one user of the first set of users is not a member of the second set of users.

19. The system of claim 17, wherein the at least one processor is further configured to allow a user to change the information associated with the set of default fields.

20. The system of claim 14, wherein that at least one processor is further configured to require that all members of the first group complete the same first group profile template.

* * * * *